R. STRAUBEL.
TESTING APPLIANCE.
APPLICATION FILED FEB. 3, 1910.
962,175.
Patented June 21, 1910.
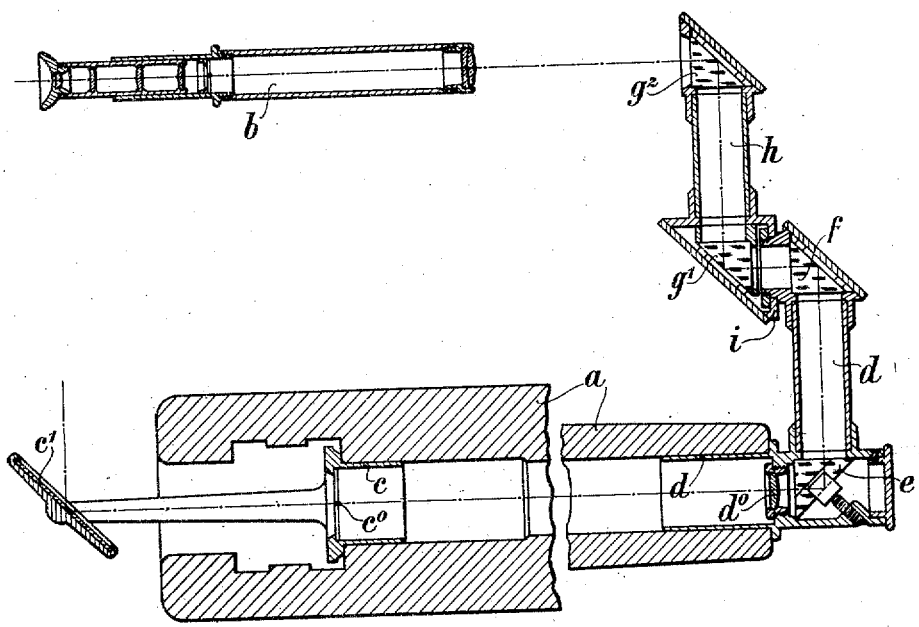
Witnesses:
Paul Krüger
Richard Hahn
Inventor:
Rudolf Straubel

UNITED STATES PATENT OFFICE.

RUDOLF STRAUBEL, OF JENA, GERMANY, ASSIGNOR TO THE FIRM OF CARL ZEISS, OF JENA, GERMANY.

TESTING APPLIANCE.

962,175.  Specification of Letters Patent.  Patented June 21, 1910.

Application filed February 3, 1910. Serial No. 541,928.

*To all whom it may concern:*

Be it known that I, RUDOLF STRAUBEL, a citizen of the German Empire, residing at Carl-Zeiss-Strasse, Jena, in the Grand Duchy of Saxe-Weimar, Germany, have invented a new and useful Testing Appliance, of which the following is a specification.

The invention relates to testing appliances which are used in ordnance for ascertaining, whether the sighting device is so adjusted that the line of sight is in its zero position parallel to the bore axis of the gun. It is an improvement on a well known appliance, which consists of a collimator adapted to be inserted in the gun, with its collective lens directed toward the barrel mouth and with the collimator axis parallel to the bore axis, and a mirror system designed to be placed before that mouth. This mirror system has separate entrance and exit openings and presents a fixed angle of deflection of 180°. When the distance between the said openings is equal to the distance between the gun sighting device and the collimator inserted in the barrel, the distant mark image projected by the collimator and reflected by the suitably located mirror system will be seen to lie in the line of sight, provided that the sighting device is correctly adjusted to its zero position.

The object of the invention is to provide a mirror system, in which the distance between the entrance and the exit opening can be varied at will, for the purpose that the appliance can be employed, for instance, in ordnance having two sighting devices at different distances from the barrel. The novel mirror system consists of two or more partial systems rotatably connected in consecutive order with the exit opening of one partial system facing the entrance opening of the other, one partial system deflecting the collimator axis by 180° and the other or the totality of the other ones deflecting it by zero, effecting thus only a parallel displacement of this axis.

As a mirror system deflecting by 180° such a one is to be preferred which consists of a plane mirror and a right-angled double mirror, both connected in such a manner that the ridge line of the double mirror is perpendicular to the plane of the plane mirror. This mirror system is superior to other ones likewise deflecting by 180°, for example, to a mere right-angled double mirror, since it reflects all of the entering rays in a direction parallel to that of entrance, not only those rays incident within the principal plane of reflection. Therefore it need not, as the other systems, be adjusted, so that the collimator axis enters within the principal plane of reflection. This system is suitably realized by two isosceles right-angled prisms, one of which has a plane, the other one a ridge hypotenusal surface.

The mirror system deflecting by zero is preferably composed of two simple reflecting isosceles right-angled prisms connected together with parallel hypotenusal surfaces. Such a system likewise need not be adjusted, so that the collimator axis enters within the principal plane of reflection.

The figure of the annexed drawing is a longitudinal section through a gun, its sighting device and an appliance fitted to the gun and constructed according to the invention.

The new appliance is combined with a gun barrel $a$, to which a sighting telescope $b$ serves as the sighting device. The telescope is presumed to have been adjusted to the zero position in the vertical as well as in the horizontal plane. Now it is to be tested, whether the line of sight of the telescope be parallel to the bore axis of the gun. The collimator inserted into the gun barrel is supposed to consist of two parts. A casing $c$ is fitted in the chamber of the barrel $a$ and carries cross wires $c^0$, the crossing point of which serves as the mark of the collimator, and further, for illuminating the cross wires, a mirror $c^1$, which receives light from the sky. A second casing $d$ is fitted in the mouth of the barrel and carries the collective lens $d^0$ of the collimator. This lens as well as the cross wires are arranged centrally in their casings, so that the collimator axis is not merely parallel to, but coincides with, the bore axis of the barrel $a$. The casing $d$ moreover carries one of the partial mirror systems. This first partial system is formed by two isosceles right-angled prisms, a ridge prism $e$ and a simple reflecting prism $f$. The other partial mirror system is formed by two simple reflecting prisms $g^1$ and $g^2$. Its casing $h$ is joined with the casing $d$ at the point where the entrance prism $g^1$ of the hinder partial system and the exit prism $f$ of the front partial system face each other. By means of this joint, the casing $h$ can be rotated about the section of the collimator axis lying between the prisms $f$ and $g^1$ so as to adjust the distance between the entrance and exit openings of the total mirror system.

I claim:

1. An appliance for testing the sighting device of a gun, consisting of a collimator, which comprises a collective lens and a mark placed in the focal plane of the lens this collimator being adapted to be inserted in the gun with the collective lens directed toward the barrel mouth and with the collimator axis parallel to the bore axis, and a mirror system composed of two partial systems having separate entrance and exit openings and being rotatably jointed together with the exit opening of one partial system and the entrance opening of the other facing each other, the angle of deflection of one partial system being 180° and that of the other partial system being zero.

2. An appliance for testing the sighting device of a gun, consisting of a collimator, which comprises a collective lens and a mark placed in the focal plane of the lens this collimator being adapted to be inserted in the gun with the collective lens directed toward the barrel mouth and with the collimator axis parallel to the bore axis, and a mirror system composed of two partial systems having separate entrance and exit openings and being rotatably jointed together with the exit opening of one partial system and the entrance opening of the other facing each other, one partial system comprising an isosceles right-angled ridge prism and an isosceles right-angled simple reflecting prism, which prisms are so combined that the angle of deflection of the partial system is 180°, and the other partial system comprising two isosceles right-angled simple reflecting prisms, which are so combined that the angle of deflection of the partial system is zero.

RUDOLF STRAUBEL.

Witnesses:
PAUL KRÜGER,
ALFRED MACKEDANZ.